United States Patent
Weinstein et al.

(10) Patent No.: US 7,137,766 B2
(45) Date of Patent: *Nov. 21, 2006

(54) SCREW AND PLASTIC PART UNIT

(76) Inventors: Burton Weinstein, 225 E. 36th, Apt.2-O, New York, NY (US) 10016; Richard H. Deaton, 3 Stuyvesant Oval, New York, NY (US) 10009

(*) Notice: Subject to any disclaimer, the term of this patent is extended or adjusted under 35 U.S.C. 154(b) by 0 days.

This patent is subject to a terminal disclaimer.

(21) Appl. No.: 11/010,233

(22) Filed: Dec. 10, 2004

(65) Prior Publication Data

US 2005/0129488 A1 Jun. 16, 2005

Related U.S. Application Data

(60) Provisional application No. 60/529,812, filed on Dec. 16, 2003.

(51) Int. Cl.
*F16B 23/00* (2006.01)
*F16B 43/02* (2006.01)
*F16B 35/02* (2006.01)
*F16B 43/00* (2006.01)

(52) U.S. Cl. .................... 411/399; 411/541; 411/383; 411/441; 411/301; 411/386; 411/533

(58) Field of Classification Search ............ 411/399, 411/541, 383, 441, 301, 386, 533, 433, 435, 411/510, 362, 363, 437
See application file for complete search history.

(56) References Cited

U.S. PATENT DOCUMENTS

| | | | | |
|---|---|---|---|---|
| 1,069,451 A | * | 8/1913 | Marston | 411/437 |
| 3,362,280 A | * | 1/1968 | Muller | 411/373 |
| 3,585,894 A | * | 6/1971 | Brown | 411/387.4 |
| 3,851,990 A | * | 12/1974 | West | 408/1 R |
| 3,861,631 A | * | 1/1975 | Shorin | 248/546 |
| 4,728,236 A | * | 3/1988 | Kraus | 411/437 |
| 4,828,444 A | * | 5/1989 | Oshida | 411/437 |
| 4,899,964 A | * | 2/1990 | Sick | 248/68.1 |
| 4,934,889 A | * | 6/1990 | Kurosaki | 411/433 |
| 5,098,242 A | * | 3/1992 | Schaty | 411/437 |
| 5,129,292 A | * | 7/1992 | Albert | 81/452 |
| 5,261,770 A | * | 11/1993 | Hoepker et al. | 411/441 |
| 5,297,322 A | * | 3/1994 | Kraus | 24/662 |
| 6,077,013 A | * | 6/2000 | Yamamoto et al. | 411/386 |
| 6,565,303 B1 | * | 5/2003 | Riccitelli et al. | 411/533 |

* cited by examiner

*Primary Examiner*—Robert J. Sandy
*Assistant Examiner*—David Reese
(74) *Attorney, Agent, or Firm*—Gordon D. Coplein

(57) ABSTRACT

A screw-plastic part unit in which the plastic part can be a guide having a tapered bottom end for fitting into a countersink to center the tip end of the screw in the countersink and also can have at least one cut-out portion at its top end to facilitate fracturing of the guide as the screw is threaded into a base member. In one embodiment the screw has a thread between its head and tip end which extends to near the tip end leaving a clear area between the thread end tip end and the part of plastic material molded around the screw clear area in which there can be a circumferential groove or rib into or over which the plastic part is molded to better hold the part to the screw. In another embodiment fins extend into the part hole to hold the screw by an interference type fit.

17 Claims, 2 Drawing Sheets

SCREW AND PLASTIC PART UNIT

PRIORITY CLAIM

This application claims the benefit of priority under 35 U.S.C. § 119(e) from U.S. Provisional application Ser. No. 60/529,812, filed Dec. 16, 2003, entitled "SCREW ONTO WHICH A PART IS MOLDED", the disclosure of which is incorporated by reference as if set forth fully herein.

FIELD OF THE INVENTION

The invention relates to a unit of a screw and a plastic part, such as a guide to position placement of the screw at a precise location.

BACKGROUND OF THE INVENTION

U.S. Pat. No. 6,602,027 granted on Aug. 26, 2003, the disclosure of which is incorporated in its entirety herein by reference, shows various types of screw centering guides of frangible plastic material in which a screw is placed. The guide has a tapered bottom end to be used to accurately position the screw in the center of a hole of a countersink, for example, one located on a hinge leaf. When the screw is threaded into the underlying workpiece to which the hinge leaf is being fastened, typically a piece of wood, the guide splits apart and is removed. While the centering guide is disclosed for use with a hinge leaf, it has other applications in which a member with a countersink is to be fastened to a base member by the use of a screw.

In use of the guide it becomes desirable to make the guide and screw a one piece integral unit so that the user does not have to insert the screw into the guide. This saves time and effort for the person using the guide.

BRIEF DESCRIPTIONS OF THE INVENTION

The subject invention is directed a unit of a screw and attached plastic part such as a guide that is to be used to center the screw in the hole of a countersink. In accordance with one embodiment of the invention a part, such as a guide to be places in a countersink, is molded directly onto a screw. In another embodiment the plastic part is molded with fins that extend in the part screw hole so that the screw is held in the hole by an interference fit.

The unit is therefore available so that the guide can be placed in the countersink hole with the screw ready to be threaded into the underlying member. This makes the screw and guide into a unit that is easier to use since the screw does not have to be inserted into the guide.

BRIEF DESCRIPTION OF THE DRAWINGS

Other objects and advantage of the present invention will become more apparent upon reference to the following specification and annexed drawings in which.

DETAILED DESCRIPTION OF THE INVENTION

Figure 1A:
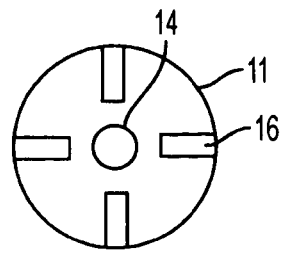
FIGS. 1A and 1B are a top plan view and a perspective view respectively of a screw centering guide of plastic that is to be molded onto a screw.
Figure 1B:
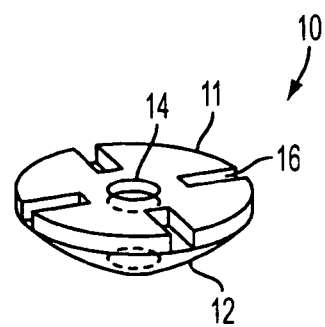
Figure 2A:
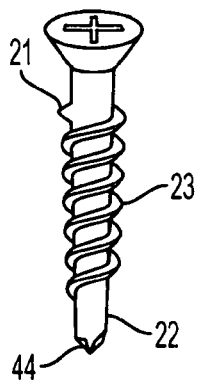
FIGS. 2A, 2B and 2C are respective elevational perspective views of different types of screws that can be used with the invention.
Figure 2B:
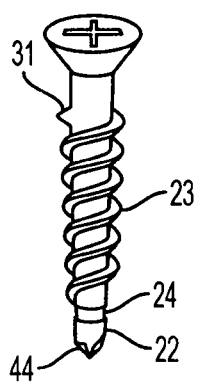
Figure 2C:
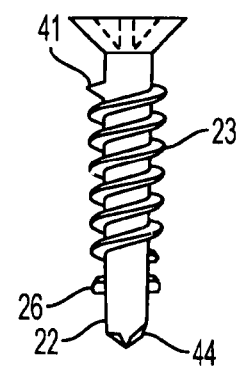

FIGS. 1A and 1B show one type of a plastic part 10 that is to be molded onto a screw such as one of the types shown in FIGS. 2A–2C. This is a plastic screw centering guide that has a generally circular top 11 and a tapered bottom 12 to be placed in the countersink of a member, such as a hinge leaf. The plastic guide has a through hole 14 for a screw to pass through and four cutouts 16 in pairs that are diametrically opposed. The cutouts 16 are generally rectangular and extend down into the guide body for a desired amount, for example from 20–30% of the height of the guide. The cutouts 16 facilitate splitting of the guide 10 as the screw is threaded into the workpiece. This operation is disclosed in the aforesaid patent. The guide 10 of FIGS. 1A–1B differs from that shown in the patent which has only two cutouts 16 diametrically spaced.

Screws 21, 31 and 41 are shown in FIGS. 2A, 2B and 2C and are so-called drill point type screws. While the screws are shown as being of the Philips head type, they can have any type of head such as a single slot. The invention is applicable to any type of screw that requires a plastic part to be molded to it. The screws of FIGS. 2A–2C are made in the conventional manner of making such screws with the necessary modifications described below which are also within the realm of screw manufacturing technology.

As shown, each screw 21, 31 and 41 has a clear, or un-threaded area 22 at its bottom end below the beginning of the thread 23 in the area where the plastic part is to be molded to it. This clear or smooth area 22 is required to afford a plastic injection mold a place to shut off or seal to, in order to prevent the injected plastic from migrating out of the mold into which it is forced under high pressure.

The screw 21 of FIG. 2A has a clear area 22 from the beginning of thread 23 to the tip end 44 of the screw. The screw 31 of FIG. 2B further has a groove 24 around its circumference between the beginning of thread 23 and the screw tip end 44. The injected plastic that forms the part can flow into the groove 24 to more securely fasten it to the screw. The groove 24 can be continuous or interrupted. The screw 41 of FIG. 2C has a rib 26 around its circumference between the beginning of thread 23 and the screw tip end 44. The injected plastic can flow around the rib 26 to more securely fasten the plastic part to the screw. The rib 26 can be continuous or interrupted.

Figure 3A:
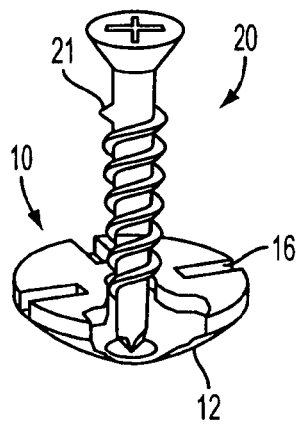
FIG. 3A is an elevational perspective view partly broken away of the screw of FIG. 2A with the molded guide.
Figure 3B:
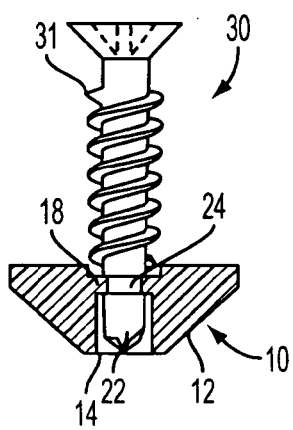
FIG. 3B is an elevational perspective view including a cross-sectional view of the guide used with the screw of FIG. 2B.
Figure 3C:
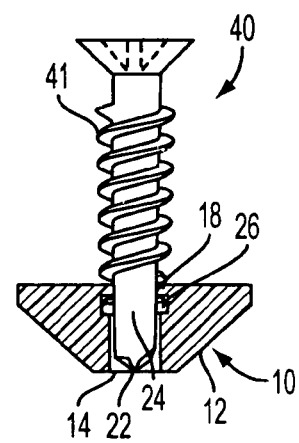
FIG. 3C is an elevational perspective view including a cross-sectional view of the guide used with the screw of FIG. 2C.

FIG. 3A shows a screw-guide unit 20. Here, there is the screw 21 onto which the guide 10 has been molded over the clear area 22 at the bottom of the screw 21. FIG. 3B show a screw-guide unit 30 of a screw 31 with a plastic centering guide 10 molded to it. As seen, a ridge 18 that is part of the molded guide 10 extends into the groove 24 in the screw. This securely fastens the guide to the screw 21. FIG. 3C shows a screw-guide unit 40 of screw 41 with a plastic centering guide 10 molded to it. As seen, the rib 28 fits into a groove 29 of the guide 10 that is molded onto the end of the screw.

In making any of the screw-guide units of FIGS. 3A–3C, a mold is made for the shape of the part to be molded, such as the centering guide 10. The mold is of conventional configuration, preferably of the multi-cavity type and split cavity if necessary, having a hole at the top of each cavity into which the screw 21, 31 or 41 is inserted. Plastic is injected into the mold cavities to form the plastic part around the bottom end of the screw to form the screw-guide units of FIGS. 3A–3C. The guides in the injection mold are cooled and the assembled units of FIGS. 3A–3C are removed. Any suitable molding technique can be used within the knowledge of those skilled in the art. Suitable materials for the plastic part, such as guide 10, include polyethylene, polypropylene, and any mixtures of plastic material.

Figure 4A:
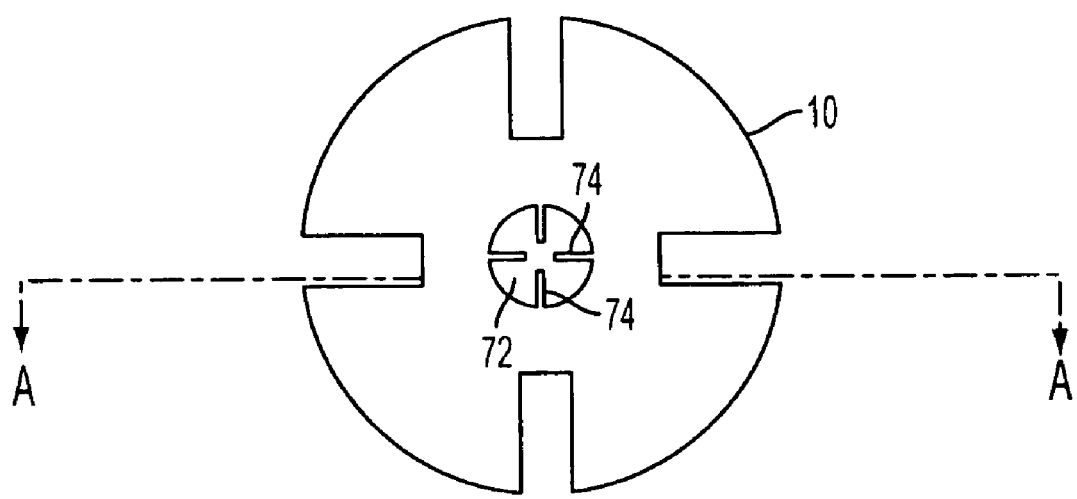
FIG. 4A is a top plan view of another embodiment of a guide.
Figure 4B:
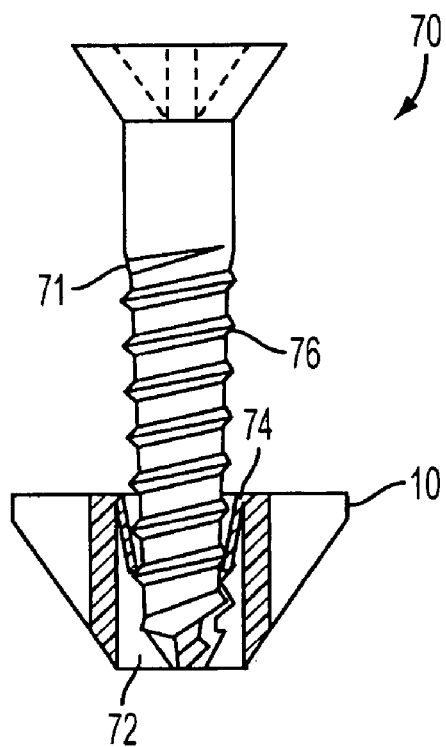
FIG. 4B is a cross-section taken along lines A—A of FIG. 4A showing the assembled unit using the guide of FIG. 4A.

In the embodiments of FIGS. 2B–3B and 2C–3C the screw is of a somewhat special construction requiring either the groove 24 or rib 26. FIGS. 4A–4B shows another embodiment of the invention in which this is not required. Here, a unit 70 is formed of a plastic part, shown as the countersink centering guide 10, that has a hole 72 to accept a screw 71 of conventional construction in which the thread 76 runs to near the tip end of the screw and there is no clear area 22 such as in the screws of FIGS. 2A–2C. In molding the part 10, fins 74 are formed on the wall that defines the hole 72. The fins 74 extend toward the center of hole 72. While four fins 74 are shown that are spaced 90° apart, it should be understood that more than four can be used and the spacing can be selected as appropriate. As seen in FIG. 4B, when the screw is inserted int the hole 72 the fins 74 are folded down against the screw thread to hold the screw centered in hole 72 by an interference fit. The unit 70 is used in the manner previously described by placing the tapered bottom part of the guide 10 in the countersink and threading the screw into the underlying member causing breakage of the guide 10.

The unit 70 is formed by making the screw 71 and guide 10 as separate pieces. Thereafter, the screw 71 is inserted into the hole 72 either manually or by an automatic machine operation.

The unit of the screw with the guide 10 molded to it is used in the following manner. The tapered bottom end 12 of the guide 10 is placed in the tapered wall of the countersink. The user can use the screw to place the guide in the countersink. This centers the pointed end of the screw in the countersink hole. When the screw is threaded down, the guide 10 splits into two or more parts along the cutouts 16.

The invention can be applied to any type of screw or part that has a smooth or an irregular surface and needs a plastic part molded to it.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

We claim:

1. A screw-plastic guide unit comprising:
    a screw having a head from which extends a body having a tip end and a thread on said body extending to near the tip end, the underside of said head tapering to said body; and
    a guide of plastic material having a first end, a second end, and a through hole extending between said first and second ends; and wherein the area generally near the tip end of the screw is integrally attached to said through hole such that the tip of the screw does not protrude beyond the second end of said through hole, the exterior of said guide at said second end having a tapered portion to rest in a depression of a base member to center the screw tip end in a hole in the base member depression, said guide also having at least one cut-out section which permits said plastic guide to fracture into pieces as the screw is threaded into it.

2. A screw-plastic guide unit as claimed in claim 1 wherein said screw is integrally attached by said body having a groove between the end of said thread and said screw tip end and said molded plastic guide through hole having a ridge that extends into said groove to engage said screw body to integrally attach said plastic guide to said screw body.

3. A screw-plastic guide unit as claimed in claim 1 wherein said screw is integrally attached by said body having a projecting rib between the end of said thread and said screw tip end and said plastic guide through hole is molded over said rib to engage said screw body to integrally attach said plastic guide to said screw body.

4. A screw-plastic guide unit as claimed in claim 1 wherein said plastic guide is for centering the tip end of said screw in a countersink of a base member and said exterior of said second end is tapered to rest in the countersink.

5. A screw-plastic guide unit as claimed in claim 2 wherein said plastic guide is for centering the tip end of said screw in a countersink of a base member and said plastic guide exterior of said second end is tapered to rest in the countersink.

6. A screw-plastic guide unit as claimed in claim 3 wherein said plastic guide is for centering the tip end of said screw in a countersink of a base member and said plastic guide exterior of said second end is tapered to rest in the countersink.

7. A screw-plastic part unit as claimed in claim 1 wherein said plastic guide at least one cut-out section is at its said guide first end to facilitate fracturing of said guide as said screw is threaded into a base member.

8. A screw-plastic guide unit as claimed in claim 5 wherein said plastic guide at least one cut-out section is at its said guide first end to facilitate fracturing of said guide as said screw is threaded into a base member.

9. A screw-plastic guide unit as claimed in claim 6 wherein said plastic guide at least one cut-out section is at said guide first end to facilitate fracturing of said guide as said screw is threaded into a base member.

10. A screw-plastic guide unit as claimed in claim 1 wherein said plastic guide is molded and includes a plurality of fins extending into said through hole, said screw inserted into said through hole being engaged and integrally attached to said guide by said plurality of fins.

11. A screw-plastic guide unit as claimed in claim 10 wherein said plastic guide exterior tapered portion at said guide second end is a guide for centering the tip end of said screw in a countersink in a base member end said tapered portion is to rest in the countersink.

12. A screw-plastic guide unit as claimed in claim 11 wherein said plastic guide at least one cut-out section is at its said first end to facilitate fracturing of said guide as said screw is threaded into a base member.

13. A screw-plastic guide unit as claimed in claim 4 wherein said plastic guide at least one cut-out section is at its said first end to facilitate fracturing of said guide as said screw is threaded into a base member.

14. A screw-plastic guide unit as claimed in claim 8 wherein said guide exterior tapered portion is of a shape corresponding to said screw head underside.

15. A screw-plastic guide unit as claimed in claim 9 wherein said guide exterior tapered portion is of a shape corresponding to said screw head underside.

16. A screw-plastic guide unit as claimed in claim 12 wherein said guide exterior tapered portion is of a shape corresponding to said screw head underside.

17. A screw-plastic guide unit as claimed in claim 1 wherein said guide exterior tapered portion is of a shape corresponding to said screw head underside.

* * * * *